(12) United States Patent
Gur et al.

(10) Patent No.: US 8,959,585 B2
(45) Date of Patent: *Feb. 17, 2015

(54) APPARATUS AND METHOD FOR RETRIEVING A BOARDING PASS

(71) Applicant: WorldMate, Ltd., Lod (IL)

(72) Inventors: Nadav Gur, Palo Alto, CA (US); Amir Kirshenboim, Tel Aviv (IL)

(73) Assignee: WorldMate, Ltd., Tel Aviv-Yafo (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,906

(22) Filed: Oct. 7, 2013

(65) Prior Publication Data

US 2014/0039948 A1 Feb. 6, 2014

Related U.S. Application Data

(63) Continuation of application No. 12/853,309, filed on Aug. 10, 2010, now Pat. No. 8,555,338.

(51) Int. Cl.
*G06F 7/00* (2006.01)
*G06Q 10/02* (2012.01)
*G06F 21/33* (2013.01)

(52) U.S. Cl.
CPC ............... *G06Q 10/02* (2013.01); *G06F 21/33* (2013.01)
USPC .................................... 726/2; 726/3; 713/185

(58) Field of Classification Search
USPC .......................................... 726/2, 3; 713/185
See application file for complete search history.

(56) References Cited

U.S. PATENT DOCUMENTS

| 6,685,093 B2 * | 2/2004 | Challa et al. ............. 235/462.46 |
| 7,044,371 B2 | 5/2006 | Dove et al. |
| 8,555,338 B2 * | 10/2013 | Gur et al. ........................ 726/2 |
| 2002/0174185 A1 | 11/2002 | Rawat et al. |
| 2004/0044674 A1 | 3/2004 | Mohammadioun et al. |
| 2004/0240408 A1 | 12/2004 | Gur |
| 2005/0109843 A1 | 5/2005 | Dove et al. |
| 2005/0137916 A1 | 6/2005 | McElhannon |
| 2005/0216824 A1 | 9/2005 | Ferguson et al. |
| 2007/0016897 A1 | 1/2007 | Todd |

(Continued)

OTHER PUBLICATIONS

Final Office Action for U.S. Appl. No. 12/852,488, mailed Jan. 17, 2013, 23 pages.

(Continued)

*Primary Examiner* — Beemnet Dada
*Assistant Examiner* — Sayed Beheshti Shirazi
(74) *Attorney, Agent, or Firm* — Foley & Lardner LLP

(57) ABSTRACT

A system for retrieving and presenting a boarding pass includes a mobile computer apparatus configured to monitor incoming messages for boarding pass information from an entity issuing a boarding pass and send a request for a boarding pass to a remote server in response to detecting boarding pass information. The request includes the detected boarding pass information and a display characteristic of the mobile computer apparatus. The system further includes a remote server configured to use the boarding pass information to retrieve additional boarding pass information from the entity issuing the boarding pass, in response to receiving the request. The remote server is further configured to generate a new boarding pass formatted for presentation via the mobile computer apparatus based on the display characteristic of the mobile computer apparatus and the boarding pass retrieved from the entity issuing the boarding pass.

13 Claims, 3 Drawing Sheets

(56) References Cited

U.S. PATENT DOCUMENTS

| | | |
|---|---|---|
| 2007/0130463 A1 | 6/2007 | Law et al. |
| 2007/0220271 A1* | 9/2007 | Law ........................... 713/185 |
| 2007/0226754 A1 | 9/2007 | Grabarnik et al. |
| 2007/0239494 A1 | 10/2007 | Stephens et al. |
| 2007/0244793 A1 | 10/2007 | Boesel |
| 2008/0196016 A1 | 8/2008 | Todd |
| 2008/0215383 A1 | 9/2008 | Sundt et al. |
| 2008/0222246 A1 | 9/2008 | Ebling et al. |
| 2009/0100367 A1 | 4/2009 | Dargahi et al. |
| 2009/0234844 A1 | 9/2009 | Kaehler et al. |
| 2010/0258630 A1 | 10/2010 | Shenfield et al. |
| 2010/0269154 A1* | 10/2010 | Knowles et al. ................ 726/3 |
| 2011/0126141 A1* | 5/2011 | King et al. .................... 715/769 |
| 2011/0216064 A1* | 9/2011 | Dahl et al. .................... 345/428 |
| 2011/0239160 A1 | 9/2011 | Kirshenboim et al. |
| 2012/0042024 A1 | 2/2012 | Kirshenboim |
| 2012/0042371 A1 | 2/2012 | Gur et al. |
| 2012/0209840 A1 | 8/2012 | Gur |
| 2013/0179423 A1 | 7/2013 | Gur et al. |

OTHER PUBLICATIONS

Non-Final Office Action for U.S. Appl. No. 12/852,488, mailed Jul. 3, 2012, 18 pages.
Non-Final Office Action for U.S. Appl. No. 13/207,440, mailed Mar. 11, 2013, 11 pages.

* cited by examiner

APPARATUS AND METHOD FOR RETRIEVING A BOARDING PASS

CROSS-REFERENCE TO RELATED APPLICATIONS

This application is a continuation of U.S. patent application Ser. No. 12/853,309, filed Aug. 10, 2010, which is incorporated by reference herein in its entirety.

BACKGROUND

The present invention relates to travel management system in general and to management of mobile boarding passes and similar electronic check-in passes in particular.

In many known mobile computer applications, the user receives messages on a mobile device comprising a link to information available on a network. The message may be an SMS, an email message, WAP push and the like. Such a link may include a URL link to a server that generates an XML or HTML web page comprising a barcode. Such a barcode may be a mobile boarding pass.

Mobile boarding passes are usually delivered according to IATA PSC(30)792 using 2D barcodes embedded in an HTML page. Airlines typically publish the boarding passes on the web at a unique URL address and provide the passengers that URL by sending the URL to a mobile phone, via. SMS, e-mail, WAP push or similar messaging mechanism. When the user clicks on the URL, a request is sent to the unique URL address in which the barcode is published. The request comprises the identification of the type or specifications of the mobile device. Upon receiving the message, an HTML or XML page comprising the barcode is generated. Generating the image is based on the type of the mobile device, since the image is adapted to the screen of the mobile device. The generated page is sent back to the mobile device, usually as an HTML or as an XML web page.

The barcode is used to identify the passenger and/or the flight ticket and allow checking into the flight. To access the boarding pass the passenger is required to locate the message in the inbox, open the message, and click the URL to download and display the web-page. The barcode can then be presented to a barcode reader for identification purposes. The server of the airline company may dynamically generate the bar code upon request The barcode may be dynamically generated in order to make the barcode compatible to the identification of the device. Such identifications may be, for example, the size and type of the screen of the device and the like.

SUMMARY

One exemplary embodiment of the disclosed subject matter is a computerized apparatus having a processor configured for providing an access to an authentication token, the authentication token is generated by a remote computing device, wherein a link to the remote computing device is embedded in a message sent to the computerized apparatus, the apparatus comprises a message detecting module configured for detecting the message; a transmitting module configured for sending a request to the remote computing device for receiving the authentication token, wherein the request is according to the link being extracted; to a downloading module configured for downloading the authentication token being returned from the remote computing device; a storing module configured for storing the authentication token downloaded by the downloading module in a storage of the computerized device; and an access module configured for accessing the authentication token, stored in the storage, according to predetermined rules. The apparatus further comprising a processing module configured for extracting the link from the message being detected. The authentication token comprises an image of the token and wherein the access module further comprising a display module configured for displaying the image. The authentication token comprises a numeric code and the access module further comprising a transmitting device configured for transmitting the numeric code to a reader. The authentication token comprises a sound and the access module further comprising a sound player device configured for playing the sound. The authentication token comprises a barcode. The barcode comprises a boarding pass. The transmitting device is an NFC device and wherein the code reader is an NFC reader. The message being selected from a group consisting of an email message, an SMS, an NFC message, WAP push and an MMS message. The predetermined rules comprise event base rules. The predetermined rules comprise time base rules. The predetermined rules comprise location base rules. The event base rules comprise Wi-Fi events. The event base rules comprise cellular events. The event base rules comprise Near Field Communication events.

Another exemplary embodiment of the disclosed subject matter is a computerized method for providing an access from a computerized apparatus to an authentication token, the authentication token being generated by a remote computing device, wherein a link to the remote computing device being embedded in a message sent to the computerized apparatus, the method comprises: detecting the message; extracting the link from the message being detected; sending a request to the remote computing device for receiving the authentication token, wherein the request is according to the link being extracted; downloading the authentication token being returned from the remote computing to device; storing in the computerized apparatus the authentication token being downloaded; and accessing the authentication token stored in the computerized apparatus, according to predetermine rules. The step of extracting is performed by a message processing computing device and the step of sending the request is performed by the message processing computing device. The authentication token comprises an image of the token and wherein the accessing further comprising displaying the image. The authentication token comprises a numeric code and the accessing further comprising transmitting the numeric code to a reader. The authentication token comprises a sound and the accessing further comprising playing the sound. The message is selected from a group consisting of an email message, an SMS, WAP push, and an MMS message. The accessing is performed manually. The predetermined rules comprise event base rules. The predetermined rules comprise time base rules. The predetermined rules comprise location base rules. The event base rules comprise Wi-Fi events. The method event base rules comprise cellular events. The event base rules comprise Near Field Communication events.

Another exemplary embodiment of the disclosed subject matter is a computerized implemented apparatus configured for processing a message received from a computerized device; the message comprising a link to a remote computing device, the remote computing device is configured for generating an authentication token upon receiving a request, the apparatus comprising: a receiver configured for receiving the message from the computerized device; and for receiving a return message comprising a link to the authentication token from the remote computing device; a processing module configured for extracting the link to the remote computing device from the message; and a transmitting module configured for sending the request to the remote computing device, wherein the request is according to the link being extracted. The apparatus further comprising a downloading module configured for downloading the authentication token received from the remote computing device to the computerized device.

Another exemplary embodiment of the disclosed subject matter is a computer program placed on a magnetic readable medium for providing an access from a computerized apparatus to an authentication token, the authentication token being generated by a remote computing device, wherein a link to the remote computing device being embedded in a message sent to the computerized device, the computer program comprising: a first program instruction for detecting the message; a second program instruction for sending a request message for receiving the authentication token; a third program instruction for storing in the computerized apparatus the authentication token; and a forth program instruction for accessing the authentication token stored in the computerized apparatus, according to predetermined rules, wherein the first, second third and fourth program instructions are stored on the computer readable medium.

BRIEF DESCRIPTION OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
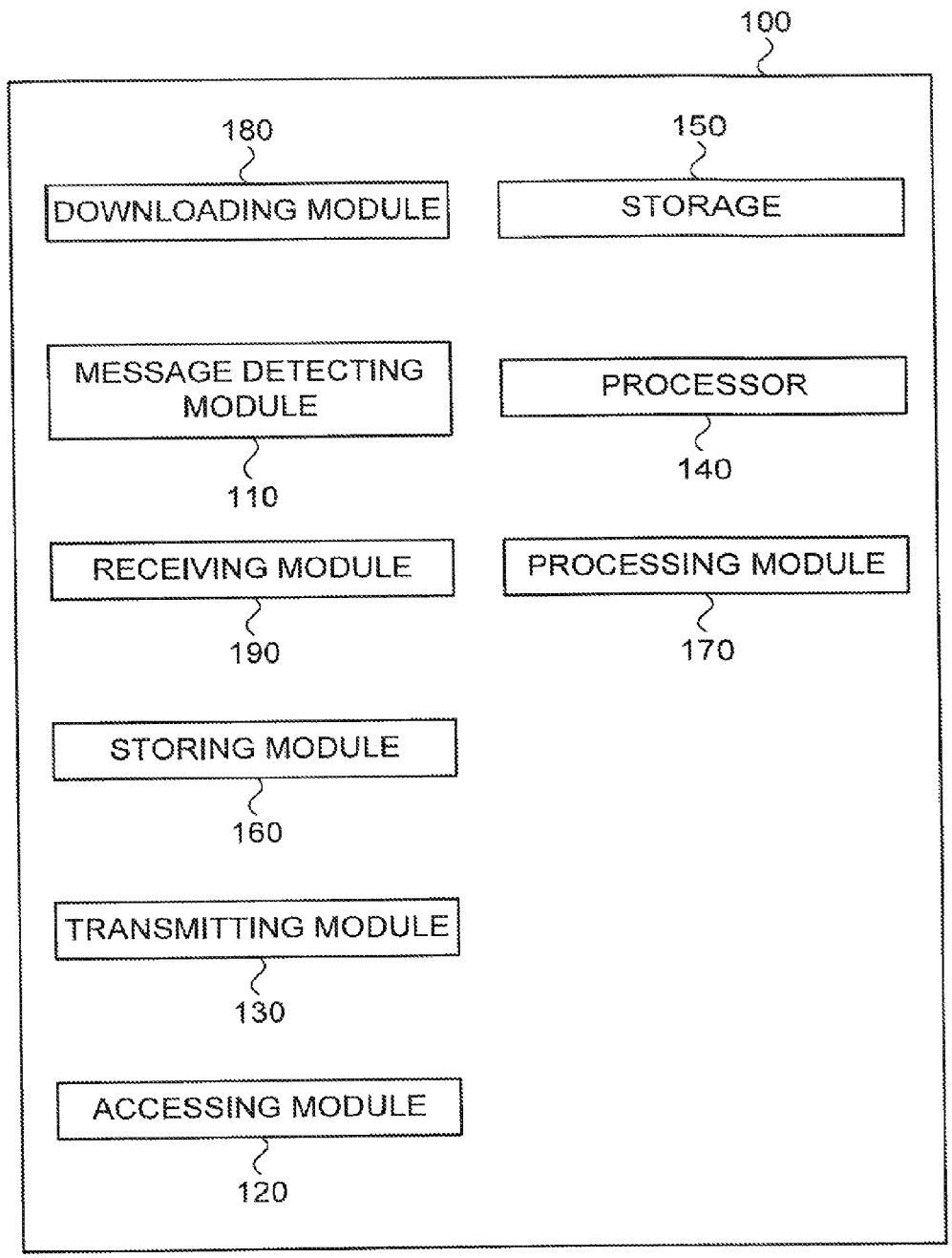
FIG. 1 shows a schematic drawing of an computerized device for providing an access to an authentication token generated by a remote computing device in accordance with some exemplary embodiments of the disclosed subject matter.

One technical problem dealt with by the disclosed subject matter is the need for an instant access from a computerized device to an authentication token that is generated by a remote computing device, wherein the link to the remote computing device is embedded in a message sent to the computerized device. The computerized device may be a mobile device. The message may be, for example, an email message, an SMS message, WAP push and the like. Such an authentication token may be, for example, a barcode, such as, for example, a boarding pass barcode. The access may be required at a critical time. Such a critical time may be, for example, when a user of a mobile device is about to board on a flight. In such a case, locating the message in the inbox or in the SMS list of messages, which may contain hundreds of other messages, opening the message and clicking on the URL to download the web page containing the boarding pass barcode may be inconvenient and not efficient. The remote computing device may be a remote server, such as, for example a server of an airline company that generates barcodes for flight boarding passes.

Another technical problem dealt with by the disclosed subject matter is the availability of the authentication token in real time. Accessing the remote computing device at a certain time, may not be possible due to network coverage limitations or other network issues, especially in confined spaces like an airport gate or a hotel corridor.

One technical solution of the disclosed subject matter comprises a computerized device having a processor configured for providing instant access to an authentication token. The access may be according to rules. The rules may be time based or event base rules and the like. Such rules provide availability of the authentication token at required time and location. The rules may enable automatic retrieval of the authentication token. The rules may also enable manual access, such as for example by using dedicated GUI.

The computerized device may be a mobile device such as a mobile telephone. The instant access to the authentication token may be enabled by retrieving the authentication token and storing a copy of the authentication token in the local storage of the computerized device, prior to using the authentication token. Retrieving the authentication token may be done by issuing a request to the remote computing device to generate the token and then downloading the token that is generated by the remote computing device. The request may be an HTTP request. Storing a copy of the authentication token in the local storage of the computerized device enables to access the authentication token upon demand and without being dependent on the communication with the token generator computer at the time when the token is required.

The remote computing device may be a server. Generating the token may be dynamically performed by the remote computing device upon receiving a request. The remote computing device may generate a web page comprising the authentication token to be downloaded to the computerized device. The remote computing device may generate the token according to the type of the computerized device or according to the specifications of the computerized device. Such an adaptation to a device is required since some authentication tokens, such as, an image based or sound base authentication token have to be adapted to the unique features of the device. Therefore, the link, embedded in the computerized device, from which the authentication token is retrieved, is not a direct link to the authentication token, but a link to the remote computing device that dynamically generates the authentication token only when the link is opened by the devices' browser. By contrast, in methods known in the art, such as images embedded in a message, the image is created a-priory and directly through a link that is embedded in the message.

FIG. 1 shows a schematic drawing of a computerized device for providing an access to an authentication token generated by a remote computing device, in accordance with some exemplary embodiments of the disclosed subject matter. The computerized device may be a mobile device; such as, for example a cellular telephone. Computerized device 100 comprises a processor 140. The computerized device 100 may comprise a message detecting module 110, for detecting the specific type of message, a transmitting module 130, a receiving module 190, a storing module 160 and a storage 150 for storing the received authentication token in the device, an accessing module 120 for accessing the authentication token, a processing module 170 for processing the detected message and in particular for extracting the link from the detected message and a downloading module 180 for downloading the authentication token.

In some exemplary embodiments, the message processing may be performed by a message processing computing device. In such a case, the message processing computing device may send the extracted link to the computerized device 100 and the computerized device 100 may send a request to the remote server. Alternatively, the message processing computing device may proxy a request to the remote server. The message processing computing device may be a server. The computerized device and the message processing computing device may be connected via the internet network. The request is according to the is extracted link. A request message comprises a request for retrieving the authentication token and an characteristic of the device. The characteristic of the device may be a type of the device, specification of the device, such as, for example, specification of the screen of a mobile device and the like.

The message-detecting module 110 may capture every message that is sent to the computerized device 100 and may detect the messages that are related to the authentication process. The detection process is described in greater details in FIG. 3.

In some exemplary embodiments, the transmitting module 130 may be activated upon detecting the message. In such a case, the detected message may be transmitted to the message processing computing device for being processed.

In some other exemplary embodiments, the transmitting module 130 may be activated after the message is processed by the processing module 170. In such a case, the transmitting module 130 may transmit a request message to the remote computing device.

The receiving module 190 may receive the extracted link form the message-computing device, as disclosed above.

The downloading module 180 may download the authentication token generated by the remote computing device. The downloading may be directly from the remote computing device or through the message processing computing device.

The storing module 160 may store a copy of the authentication token in the storage 150. The storage 150 may comprise memory and the like.

The authentication token may be retrieved manually or automatically by the accessing module 120. The accessing module 120 may comprise a calendar application, itinerary management system carrying flight information, or any other application that may comprise options for retrieving and displaying the information. Retrieving the authentication token automatically may be done as a response to an external event such as, for example, event that indicates the arrival at a specific location. The arrival may be detected by means such as GPS, position-finding using Wi-Fi or cellular events such as handover or using near field communication (NFC). Retrieving the authentication token automatically may be done according to time or event-based rules; Rules regarding the time may comprise, for example, rules regarding the time of flight. The flight time and other parameters may be retrieved from the message or by receiving data from airlines companies, for example. Event based rules may comprise events related to the flight status such changes, for example, change of the flight's status to "Boarding Now". The access module 120 may comprise a Graphical User Interface (GUI) for presenting the authentication token and for enabling manual retrieval.

The authentication token may comprise a barcode, such as, for example, a barcode of a boarding pass. The authentication token may comprise a sound, an image or a numeric code. The authentication token may be embedded in an HTML or XML document.

Figure 2:
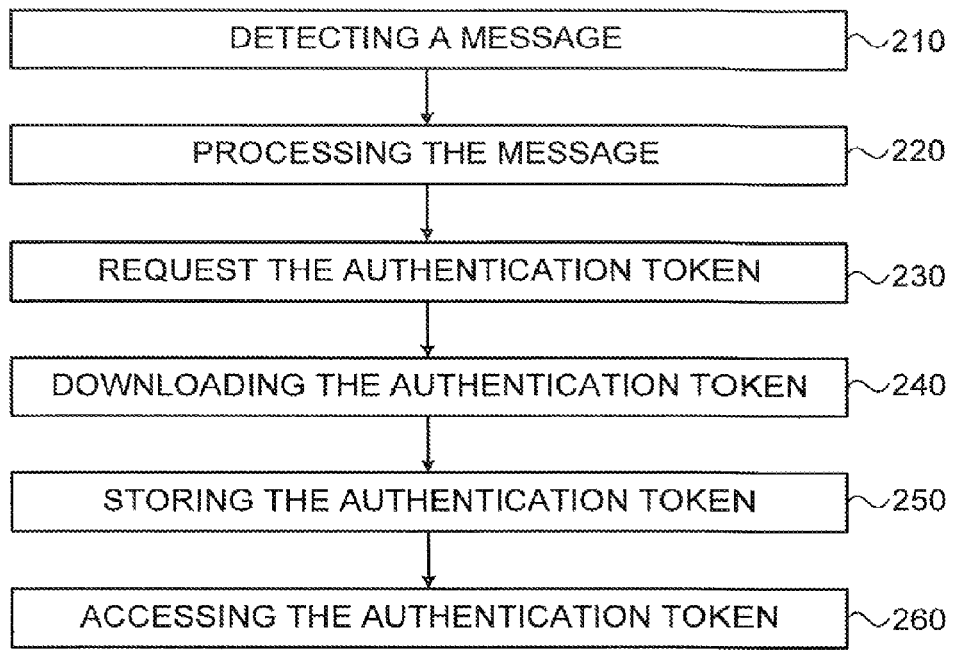
FIG. 2 shows a method for providing an access to an authentication token generated by a remote computing device, in accordance with some exemplary embodiments of the disclosed subject matter.

FIG. 2 shows a method for providing an access to an authentication token generated by a remote computing device, in accordance with some exemplary embodiments of the disclosed subject matter.

In step 210, the message may be detected. Detecting the received message may comprise matching the source address of the message with a pre-defined list of sources. Detecting the received message may comprise searching for a specific title, or specific key words in the title and/or in the body of the message and the link. Detecting the received message is described in greater details in FIG. 3.

In step 220, the detected messages may be processed. Processing the detected message may comprise extracting the link from the message. Extracting the link may be done by parsing and searching for specific links. Extracting may be based on pre-defined rules. Such pre-define rules may comprise rules based on the structure of the message. For example, messages sent from an airline company may comprise a specific structure in which the link has a specific position.

In step 230, a request may be sent to the remote computing device. The request may comprise characteristic of the type of computerized device, the request may be according to the extracted link.

In step 240, the authentication token may be downloaded to the computerized device from the remote computing device.

In step 250, the downloaded authentication token may be stored at the mobile device. Storing the authentication token at the mobile device prior to accessing the authentication token may provide an instant access to the authentication token upon demand, without being dependent on the network connection.

In step 260, the stored authentication token may be accessed. Accessing may be performed automatically as a response to an event, or according to rules. In some embodiments, the accessing module 120 may identify that a passenger carrying the mobile device is located in the check in security area and automatically display the boarding pass. In another embodiment, the accessing module 120 may display the barcode at the time of the check in, The application may communicate with a travel agency, or with the airport administration for receiving exact information regarding the location and the time of the check-in. Alternatively and additionally, accessing may be done manually by the user by, for example, clicking on a dedicated button. Accessing may comprise transmitting the authentication token to an external device. For example when a near field communication (NFC) enabled device may request the code from the mobile device. Accessing may comprise displaying the token on a screen of the device. Accessing may also comprise playing the token by the device when the authentication token comprises sound.

Figure 3:
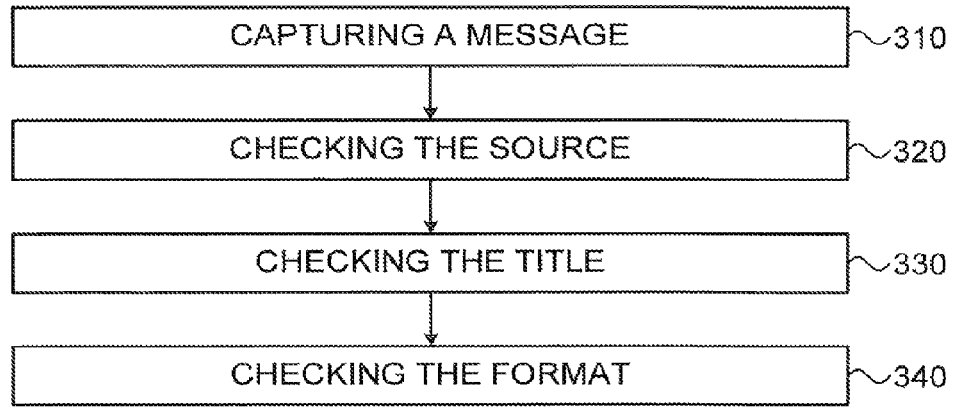
FIG. 3 shows a method for detecting a message, in accordance with some exemplary embodiments of the disclosed subject matter.

FIG. 3 shows a method for detecting the received message, in accordance with some exemplary embodiments of the disclosed subject matter. In step 310 a message is captured. According to some embodiments of the disclosed subject matter, every message that is sent to the device is captured. The message may be an SMS message, a mail message and the like. The message may also be a radio based short-distance communication message, such as for example NFC.

In step 320, the source of the message may be checked. According to some embodiments of the disclosed subject matter, the message can be sent from specific sources. For example, if the message comprises a URL for retrieving a boarding pass, then the message may be sent from an airline company. Thus, the source of the message may be used as an indicator for identifying the message.

In step 330, the title of the message may be checked, for example, by searching specific key words, such as, for example "barcode".

In step 340, the format of the body of the message may be checked. According to some embodiments of the disclosed subject matter, the boarding pass may be sent in a unique format, which may be used for identifying the message.

Figure 4:
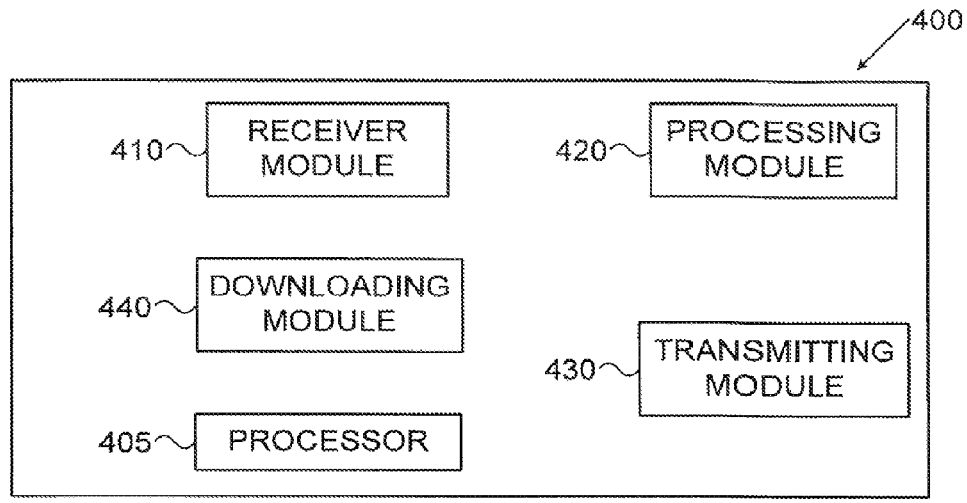
FIG. 4 shows schematic drawing of a message-processing computer, in accordance with some exemplary embodiments of the disclosed subject matter.

FIG. 4 shows schematic drawing of a message-processing computer, in accordance with some exemplary embodiments of the disclosed subject matter. The message-processing computer may be a server. The message-processing computer may receive a detected message from the computerized device. The message-processing computer may process the message. The processing of the message may comprise extracting the link from the message. In some exemplary embodiments the message-processing computing device may also send a request to the remote computing device for receiving a link to the authentication token. In some other exemplary embodiments, the message-processing computing device may provide the extracted link to the computerized device. Providing may comprise sending.

Message-processing computer 400 comprises a receiver module 410 for receiving a message from the computerized device, a processing module 420 for processing the received, a processor 405, a transmitting module 430 for transmitting a request to the remote computer device or for providing the extracted link to the computerized device. In the latter case, the request for retrieving the authentication token is sent from the computerized device. The message-processing computer may also comprise a downloading module 440 for downloading the authentication token and for providing the downloaded authentication token to the computerized device.

Figure 5:
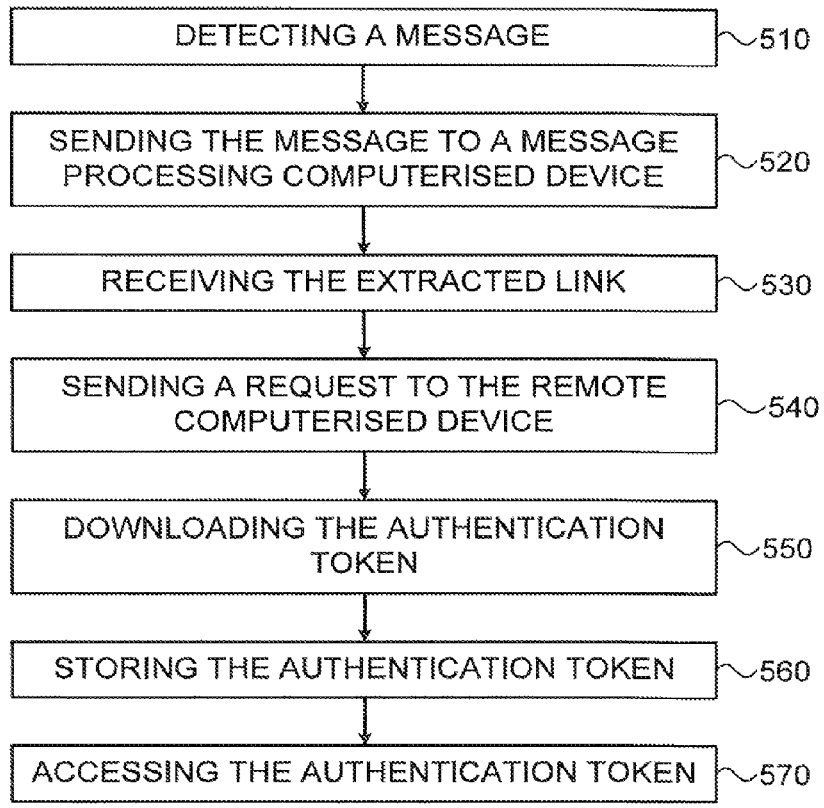
FIG. 5 shows a method for providing an access to an authentication token generated by a remote computing device when a message processing computerized device is used, in accordance with some exemplary embodiments of the disclosed subject matter.

FIG. 5 shows a method for providing an access to an authentication token generated by a remote computing device when a message detecting computing device is used, in accordance with some exemplary embodiments of the disclosed subject matter.

In step 510, the message may be detected. Detecting the received message may comprise matching the source address of the message with a predefined list of sources. Detecting the received message may comprise searching for a specific title, or specific key words in the title and/or in the body of the message and the link. Detecting the received message is described in greater details in FIG. 3.

In step 520, the detected messages may be sent to the message computing device for being processed. Processing the detected message may comprise extracting the link from the message. Processing the detected message by a message-processing computerized device may ease the process of updating the information required for the processing. Such information may be the predefined rules. Such an updating process may entail updating such information to the message processing computerized device only and does not entail the distributing of the updating information to the computerized devices. Processing the received message by a message-processing computer may also reduce the processing resources required by the computerized device.

Steps 530 and 540 may be performed if the message processing computerized device does not send a request for retrieving the authentication token to the remote computing device.

In step 530, the extracted link may be provided by the message processing computerized device.

In step 540 a request may be sent to the remote computing device.

Is step 550, the authentication token may be downloaded to the computerized device. Downloading may be from the remote computing device or from the message processing computerized device.

In step 560, the downloaded authentication token may be stored at the mobile device. Storing the authentication token at the mobile device prior to accessing the authentication token may provide an instant access to the authentication token upon demand, without being dependent on the network connection.

In step 570, the stored authentication token may be accessed. Accessing may be performed automatically as a response to an event, or according to rules. In some embodiments, the accessing module 120 may identify that a passenger carrying the mobile device is located in the check in security and automatically display the boarding pass. In another embodiment, the accessing module 120 may display the barcode at the time of the check in. The application may communicate with a travel agency, or with the airport administration for receiving exact information regarding the location and the time of the check-in. Alternatively and additionally, accessing may be done manually by the user by, for example, clicking on a dedicated button. Accessing may comprise transmitting the authentication token to an external device. For example when a near field communication (NFC) enabled device may request the code from the mobile device, accessing may comprise displaying the token on a screen of the device. Accessing may also comprise playing the token by the device when the authentication token comprises sound.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof Therefore, it is intended that the disclosed subject matter not be limited to the particular embodiment disclosed as the best mode contemplated for carrying out this invention, but only by the claims that follow.

What is claimed is:

1. A mobile computer comprising:
   a data storage device;
   a display; and
   processing electronics comprising:
   a message detecting module configured to monitor messages received by the mobile computer apparatus for boarding pass information from an entity issuing a boarding pass;
   a transmitting module configured to send a request for a boarding pass to a remote server in response to detecting boarding pass information, wherein the request is detected boarding pass information and includes a display characteristic of the mobile computer apparatus;
   a downloading module configured to receive, from the remote server, a new boarding pass transformed according to the display characteristic of the mobile computer apparatus;
   a storing module configured to store the new boarding pass in the data storage device; and
   an access module configured to retrieve the new boarding pass from the data storage device and present the new boarding pass via the display in response to an occurrence of an event, according to a predetermined rule, wherein the occurrence of the event is a change in boarding status for a transportation vehicle associated with the boarding pass and the predetermined rule comprises a rule which causes a graphical option for presenting the new boarding pass to be provided on the display in response to the boarding status changing to allow boarding of the transportation vehicle.

2. The apparatus according to claim 1, the processing electronics further comprising:
a processing module configured to extract a link to the boarding pass from the detected boarding pass information.

3. The apparatus according to claim 1, wherein the boarding pass comprises a numeric code and wherein the mobile computer apparatus further comprises a transmitting device configured for transmitting the numeric code to a reader.

4. The apparatus according to claim 1, wherein the boarding pass comprises a barcode.

5. The apparatus of according to claim 3, wherein the transmitting device is an NFC device and wherein the reader is an NFC reader.

6. The apparatus according to claim 1, wherein the messages received by the mobile computing apparatus are selected from a group consisting of email messages, SMS messages, NFC messages, WAP push messages, and MMS messages.

7. The apparatus according to claim 1, wherein the occurrence of the event is determined in response to a Wi-Fi communication received by the mobile computer apparatus.

8. The apparatus according to claim 1, wherein the occurrence of the event is determined in response to a cellular communication received by the mobile computer apparatus.

9. The apparatus according to claim 1, wherein the occurrence of the event is determined in response to a Near Field Communication received by the mobile computer apparatus.

10. A system for retrieving and presenting a boarding pass, the system comprising:
a mobile computer apparatus configured to monitor incoming messages for boarding pass information from an entity issuing a boarding pass and send a request for a boarding pass to a remote server in response to detecting boarding pass information, wherein the request includes the detected boarding pass information and a display characteristic of the mobile computer apparatus; and
a remote server configured to use the boarding pass information to retrieve additional boarding pass information from the entity issuing the boarding pass, in response to receiving the request, wherein the remote server is further configured to generate a new boarding pass formatted for presentation via the mobile computer apparatus based on the display characteristic of the mobile computer apparatus and the boarding pass retrieved from the entity issuing the boarding pass;
wherein the mobile computer apparatus is configured to store the new boarding pass in local non-volatile of the mobile computer apparatus and present the new boarding pass in response to an occurrence of an event, according to a predetermined rule, wherein the occurrence of the event is a change in boarding status for a transportation vehicle associated with the boarding pass and the predetermined rule comprises a rule which causes a graphical option for presenting the new boarding pass to be provided on a display of the mobile computer apparatus in response to the boarding status changing to allow boarding of the transportation vehicle.

11. The system according to claim 10, wherein the occurrence of the event is a change in location of the mobile computer apparatus and the predetermined rule comprises a rule which causes a graphical option for presenting the new boarding pass to be provided on a display of the mobile computer apparatus in response to the location of the mobile computer apparatus becoming within a threshold distance of a location associated with the boarding pass.

12. The system according to claim 10, wherein presenting the new boarding includes retrieving the new boarding pass from the local non-volatile memory of the mobile computer apparatus and does not require an active communications link between the mobile computer apparatus and either of the remote server or the entity issuing the boarding pass.

13. A mobile computer comprising:
a data storage device;
a display; and
processing electronics comprising:
a message detecting module configured to monitor messages received by the mobile computer apparatus for boarding pass information from an entity issuing a boarding pass;
a transmitting module configured to send a request for a boarding pass to a remote server in response to detecting boarding pass information, wherein the request is detected boarding pass information and includes a display characteristic of the mobile computer apparatus;
a downloading module configured to receive, from the remote server, a new boarding pass transformed according to the display characteristic of the mobile computer apparatus;
a storing module configured to store the new boarding pass in the data storage device; and
an access module configured to retrieve the new boarding pass from the data storage device and present the new boarding pass via the display in response to an occurrence of an event, according to a predetermined rule, wherein the occurrence of the event is a change in location of the mobile computer apparatus and the predetermined rule comprises a rule which causes a graphical option for presenting the new boarding pass to be provided on the display in response to the location of the mobile computer apparatus being within a threshold distance of a location associated with the boarding pass.

* * * * *